(No Model.)
T. A. WILSON.
CAKE PAN.
No. 572,509.                     Patented Dec. 1, 1896.
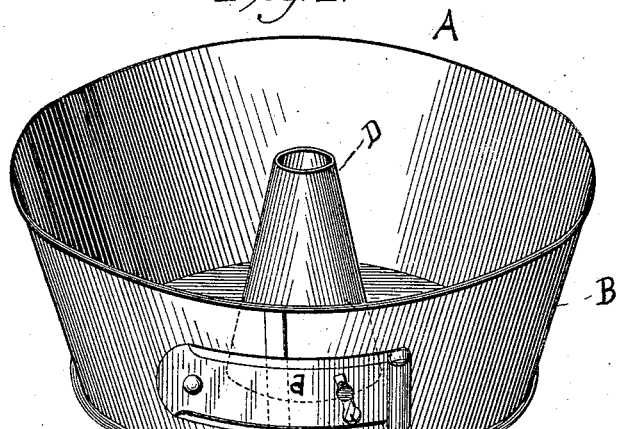
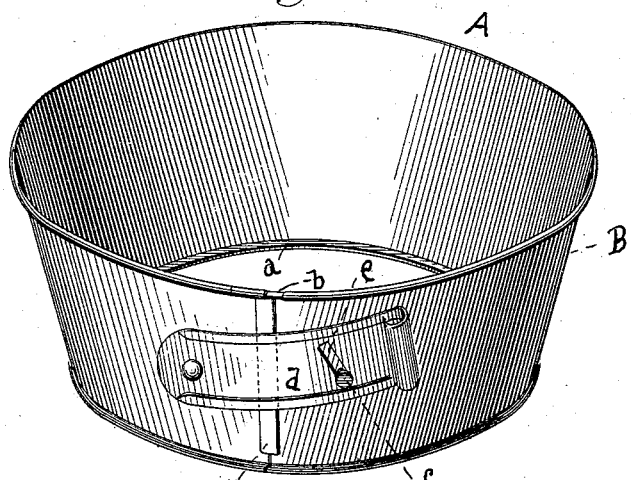
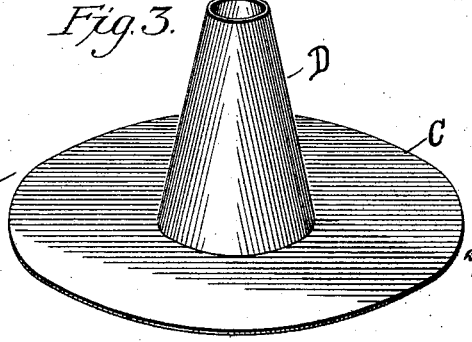
Witnesses.                       Inventor.

UNITED STATES PATENT OFFICE.

THOMAS A. WILSON, OF ALTON, MISSOURI.

CAKE-PAN.

SPECIFICATION forming part of Letters Patent No. 572,509, dated December 1, 1896.

Application filed September 7, 1895. Serial No. 561,794. (No model.)

*To all whom it may concern:*

Be it known that I, THOMAS A. WILSON, a citizen of the United States, residing at Alton, in the county of Oregon and State of Missouri, have invented a new and useful Cake-Pan, of which the following is a specification.

My invention relates to improvements in cake-pans in which the parts are separable; and the objects of my improvement are, first, to provide a cake-pan in which the parts may be separated from each other, and, second, to afford a convenient way of removing the cake from the pan without injuring the cake. I attain these objects by the mechanism illustrated in the accompanying drawings, in which—

Figure 1 is a view of the pan with all parts attached. Fig. 2 is a view of the rim (or sides) of the pan with the latch not fastened. Fig. 3 is a view of the bottom.

A represents my improved cake-pan, which consists of a divided separable rim B and a separable bottom C, provided with an upwardly-extending cylinder or tube D of substantially the shape of a frustum of a cone. The rim B is provided on its interior near the bottom with an inwardly-projecting flange or rim $a$, which not only serves as a seat for the bottom C, but also prevents the leakage of the batter from the sides and bottom. In the upper outer edge of the rim is a strengthening-roll, which surrounds a wire or rib $b$. This rib projects a short distance beyond one end of the rim and extends into a small tube formed by the outwardly-turned upper edge of the rim, thereby providing a fastening for the two ends of the rim.

$c$ is a lip that is attached to one end of the rim and extends from edge to edge thereof and overlaps the other end, thereby forming a tight joint.

$d$ represents a catch pivoted at one end to one end of the rim and adapted to extend over and beyond the other end. This catch is provided with a transversely-extending slot $e$ near the end opposite the pivoted end, one end of the slot being somewhat larger than the other, whereby the head of the locking-pin $f$ is enabled to be passed through the slot and the shank of the pin to pass upward in the slot, thereby securely fastening the ends of the rim together.

The operation of my device is as follows: When it is desired to remove the cake from the pan, the catch $d$ is disengaged from the pin $f$, thereby allowing the ends of the rim to separate, when the rim can be easily removed from the cake without defacing or otherwise injuring the same.

Having thus fully described my invention, what I claim, and desire to secure by Letters Patent, is—

In a cake-pan, the combination, with a bottom having an upwardly-extending cone-shaped tube, of a divided rim having an inner flange at its lower edge and a strengthening-roll at its upper edge, said roll having a projecting rib at one end arranged to enter the roll of the opposite end, a lip secured to one end of the rim and arranged to overlap the other end when the said ends are in alinement, and means for locking the ends together, substantially as described and for the purpose set forth.

THOMAS A. WILSON.

Witnesses:
H. E. NORMAN,
S. M. WILSON.